United States Patent
Huang et al.

(10) Patent No.: US 10,228,524 B2
(45) Date of Patent: Mar. 12, 2019

(54) OPTICAL DEVICE AND OPTICAL MODULE

(71) Applicants: HISENSE BROADBAND MULTIMEDIA TECHNOLOGIES CO., LTD., Qingdao (CN); HISENSE BROADBAND MULTIMEDIA TECHNOLOGIES, LTD., Road Town (VG)

(72) Inventors: Yungliang Huang, Qingdao (CN); Yicheng Liu, Qingdao (CN); Wenkai Tu, Qingdao (CN)

(73) Assignees: HISENSE BROADBAND MULTIMEDIA TECHNOLOGIES CO., LTD., Shandong (CN); HISENSE BROADBAND MULTIMEDIA TECHNOLOGIES, LTD., Tortola (VG)

( * ) Notice: Subject to any disclaimer, the term of this patent is extended or adjusted under 35 U.S.C. 154(b) by 0 days.

(21) Appl. No.: 15/471,949

(22) Filed: Mar. 28, 2017

(65) Prior Publication Data

US 2017/0199342 A1    Jul. 13, 2017

Related U.S. Application Data

(63) Continuation of application No. 14/197,160, filed on Mar. 4, 2014, now Pat. No. 9,644,818.

(30) Foreign Application Priority Data

Apr. 3, 2013   (CN) .................... 2013 2 0162479 U

(51) Int. Cl.
G02B 6/42        (2006.01)
G02B 19/00       (2006.01)
(Continued)

(52) U.S. Cl.
CPC ............ G02B 6/4214 (2013.01); F21V 13/04 (2013.01); G01J 1/0425 (2013.01); G01J 1/44 (2013.01);
(Continued)

(58) Field of Classification Search
CPC ................ G02B 6/4214; G02B 6/4286; G02B 19/0028; G01J 1/44; G01J 1/0425
See application file for complete search history.

(56) References Cited

U.S. PATENT DOCUMENTS

| 5,226,104 A | 7/1993 | Unterleitner et al. ........ 385/140 |
| 2001/0015408 A1 | 8/2001 | Stock .......................... 250/338.5 |

(Continued)

FOREIGN PATENT DOCUMENTS

| CN | 202275188 U | 6/2012 |
| CN | 203149147 U | 8/2013 |

*Primary Examiner* — Tony Ko
(74) *Attorney, Agent, or Firm* — J.C. Patents

(57) ABSTRACT

The invention discloses an optical device and an optical module, the optical device includes a collimation lens arranged on an outer surface for converting incident light from a light source to parallel light, further includes a transmission light total reflection surface for totally reflecting a part of the parallel light at a first angle so that the part of the parallel light is finally coupled to an external optical fiber, a detection light total reflection surface for totally reflecting a part of the parallel light at a second angle so that the part of the parallel light is finally coupled to an external optical detector, and at least one attenuation light reflection surface for totally reflecting parallel light to be attenuated at a third angle before the parallel light leaves the optical device. The invention achieves the light intensity attenuation while realizing the direction-changing transmission of light signals.

18 Claims, 4 Drawing Sheets

(51) Int. Cl.
  *F21V 13/04* (2006.01)
  *G01J 1/04* (2006.01)
  *G01J 1/44* (2006.01)

(52) U.S. Cl.
  CPC ....... *G02B 6/4286* (2013.01); *G02B 19/0028* (2013.01)

(56) References Cited

U.S. PATENT DOCUMENTS

| | | | |
|---|---|---|---|
| 2004/0179784 A1 | 9/2004 | Vancoille et al. | 385/47 |
| 2005/0147353 A1 | 7/2005 | Vancoill et al. | 385/47 |
| 2012/0261559 A1 | 10/2012 | Yan et al. | 250/227.28 |
| 2014/0027624 A1 | 1/2014 | Hung | 250/227.11 |
| 2014/0328558 A1* | 11/2014 | Morioka | G02B 6/4286 385/33 |

* cited by examiner

OPTICAL DEVICE AND OPTICAL MODULE

CROSS-REFERENCE TO RELATED APPLICATIONS

This application is a continuation of U.S. application Ser. No. 14/197,160, filed on Mar. 4, 2014, which claims priority to Chinese Patent Application No. 201320162479.X, filed on Apr. 3, 2013, entitled "OPTICAL DEVICE AND OPTICAL MODULE", which is hereby incorporated by reference in its entirety.

TECHNICAL FIELD

The present invention relates to the field of optical communication technologies, in particular, to optical equipment, and more particularly, to an optical device with total reflection surfaces for achieving light signal transmission and light intensity attenuation, and an associated optical module.

BACKGROUND

In existing optical modules used in the field of optical communication, the transmission direction of a light beam emitted by a laser is changed to couple the light beam to an optical fiber, or the transmission direction of a received light beam in the optical fiber is changed to couple the received light beam to a photoelectric detector. A plurality of reflectors are usually obliquely arranged to change the transmission direction of the beams. A large number of reflectors are involved, complex structures are arranged, the assembly is complicated, and the normal transmission of light signals is affected easily due to position errors. Therefore, it is proposed that an integrated optical device with multi-structural-surfaces can be adopted to achieve the direction-changing transmission of light signals. Generally, the light emitted by the laser of the optical module is relatively large in intensity and needs to be attenuated before entering the optical fiber. Such optical device with multi-structural-surfaces usually includes light-absorbing dielectric materials which are added to absorb light, so as to achieve the purpose of the light intensity attenuation. In this way of attenuating the light intensity, not only the production process is complex, but also the degree of the light intensity attenuation is difficult to control, thereby resulting in relatively low performance, relatively high cost and difficulty in producing of the optical device.

SUMMARY

One of the purposes of the invention is to provide an optical device, by arranging a plurality of total reflection surfaces in the optical device, the purpose of light intensity attenuation is achieved while the direction-changing transmission of light signals is realized, which solves the above technical problem in the prior art effectively.

In order to solve the above technical problem, the following technical solutions are provided in the present invention:

an optical device, including a collimation lens arranged on an outer surface and used for converting the incident light emitted by a light source to parallel light, the optical device further includes a transmission light total reflection surface used for totally reflecting a part of the parallel light transmitted by the collimation lens at a first predetermined angle so that the part of the parallel light is finally coupled to an external optical fiber, a detection light total reflection surface used for totally reflecting a part of the parallel light transmitted by the collimation lens at a second predetermined angle so that the part of the parallel light is finally coupled to an external optical detector, and at least one attenuation light total reflection surface used for totally reflecting the parallel light to be attenuated which is transmitted by the collimation lens at a third predetermined angle before the parallel light to be attenuated leaves the optical device.

For the optical device as described above, there is one attenuation light total reflection surface, the optical device further includes one transmissive surface corresponding to the attenuation light total reflection surface and used for transmitting all or part of the reflected light from the attenuation light total reflection surface.

For the optical device as described above, preferably, the attenuation light total reflection surface is obliquely arranged at an inclined angle of 45 degree with respect to the direction of the parallel light transmitted by the collimation lens, so as to achieve the direction change of 90 degree of light signals. Moreover, the transmissive surface is preferably arranged vertical to the direction of the reflected light from the attenuation light total reflection surface, so as to make all of the reflected light of the attenuation light total reflection surface pass through the transmissive surface.

For the optical device as described above, there may be two attenuation light total reflection surfaces, the optical device further includes two transmissive surfaces corresponding, one to one, to the two attenuation light total reflection surfaces and used for transmitting all or part of the reflected light from the corresponding attenuation light total reflection surface.

Preferably, both the attenuation light total reflection surfaces are obliquely arranged at an inclined angle of 45 degree with respect to the direction of the parallel light transmitted by the collimation lens, so as to achieve the direction change of 90 degree of light signals. Moreover, each of the two transmissive surfaces is preferably arranged vertical to the direction of the reflected light from the corresponding attenuation light total reflection surface, so as to make all of the reflected light of the attenuation light total reflection surface pass through the transmissive surface.

For the optical device as described above, in order to achieve the coupling to the external optical fiber after the direction of the light signal is changed, a first focus lens is further arranged on an outer surface of the optical device and non-coplanar with the collimation lens, the transmission light total reflection surface is obliquely arranged in a direction which forms an inclined angle of 45 degree with the direction of the parallel light transmitted by the collimation lens so that the reflected light from the transmission light total reflection surface can be directly transmitted to the first focus lens.

For the optical device as described above, in order to facilitate the monitoring of the light signal intensity, the optical device further includes a second focus lens arranged coplanar with the collimation lens, the optical device further includes one secondary total reflection surface, the detection light total reflection surface is obliquely arranged in a direction which forms an inclined angle of 45 degree with the direction of the parallel light transmitted by the collimation lens so that the reflected light from the detection light total reflection surface can be directly transmitted to the secondary total reflection surface, the secondary total reflection surface is obliquely arranged in a direction which forms an inclined angle of 45 degree with the direction of the reflected light of the detection light total reflection surface so that the reflected light from the secondary total reflection surface can be directly transmitted to the second focus lens.

The invention also provides an optical module, the optical module adopts an optical device of the above structure to achieve the transmission of light signals.

Furthermore, an embodiment of the invention further provides an optical device, which includes a light incident portion, and a light attenuation portion used for attenuating the light incident in the light incident portion, the light attenuation portion includes an attenuation surface, the attenuation surface is an attenuation reflection surface or an attenuation transmissive surface.

The optical device as described above further includes a transmission light reflection portion used for changing the transmission direction of the incident light, the transmission light reflection portion includes a transmission light reflection surface, the transmission light reflection surface includes a coupling reflection surface and/or a detection reflection surface; moreover, the transmission light reflection surface and the attenuation surface intersect, and at least some points of intersection are located on the optical path of the incident light.

For the optical device as described above, the optical path of the light processed by the attenuation surface and the optical path of the light processed by the transmission light reflection surface do not intersect.

The transmission light reflection surface, the detection reflection surface and the attenuation surface intersect at one vertex, orthogonal projection of the vertex in the plane where the light incident portion is located is in the light incident portion.

Compared with the prior art, the advantages and positive effects of the invention are that: by arranging a plurality of total reflection surfaces in the optical device, the invention can achieve the purpose of light intensity attenuation by utilizing the total reflection surfaces to allow a part of the light to be attenuated to leave the optical device, while the direction-changing transmission of the light signal is realized by utilizing the total reflection surfaces and the light signal is finally coupled to the output optical fiber for output, thereby multiple functions of the optical device is realized by using a simple structure and reliable control, and the performance of use of the optical device is improved.

After embodiments of the invention are read with reference to the accompanying drawings, other characteristics and advantages of the invention will become clearer.

DESCRIPTION OF EMBODIMENTS

Figure 1:
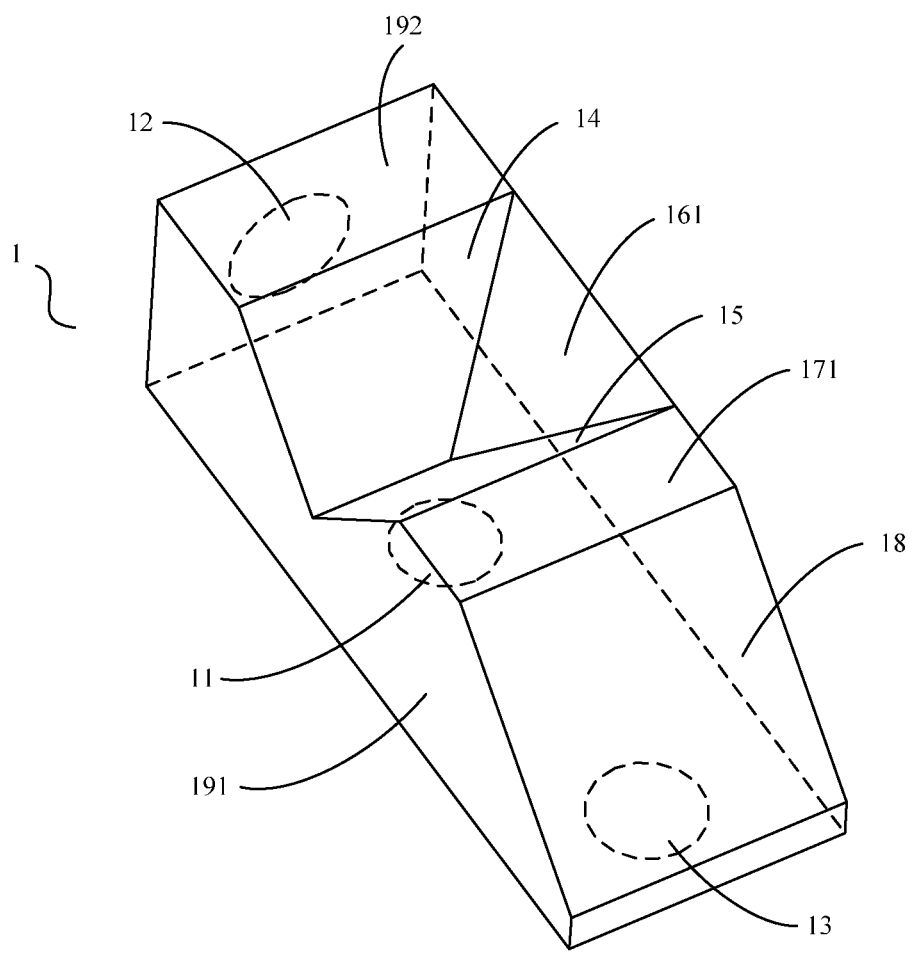
FIG. 1 is a schematic structural view of an embodiment of an optical device according to the invention.

The technical solutions of the invention are further described in detail with reference to the accompanying drawings and embodiments.

An embodiment of the invention provides an optical device, the optical device includes a light incident portion, and a light attenuation portion for attenuating the light incident through the light incident portion, the light attenuation portion includes an attenuation surface, the attenuation surface is an attenuation reflection surface or an attenuation transmissive surface.

Furthermore, the optical device may further include a transmission light reflection portion for changing the transmission direction of the incident light, the transmission light reflection portion includes a transmission light reflection surface, the transmission light reflection surface includes a coupling reflection surface and/or a detection reflection surface; moreover, the transmission light reflection surface and the attenuation surface intersect, and at least some of the points of intersection are located on the optical path of the incident light.

Where, the transmission light reflection surface and the attenuation surface intersect, and some of the points of intersection are located on the optical path of the incident light, which should be understood as: both the transmission light reflection surface and the attenuation surface should be irradiated by the incident light; preferably, the orthogonal projection of the some of the points of intersection relative to the plane on which the light incident portion is located is in the light incident portion. On the other hand, the transmission light reflection surface is configured to reflect the transmission light for use, therefore, in another embodiment of the invention, all or part of the transmission light reflection surface can be modified to a transmission light transmissive surface, that is, the transmission light may pass through the transmission light transmissive surface for use.

It should be noted that, the optical path of the light processed by the attenuation surface and the optical path of the light processed by the transmission light reflection surface do not intersect in the invention, so that the quality of the light processed by the transmission light reflection surface is not affected.

The invention further provides an optical module, the optical module includes a PCB and an optical device arranged on the PCB, the optical device can adopt an optical device of the above-mentioned structure. As an example, the optical device has a light incident portion, a light attenuation portion and a transmission light reflection portion, for example, the light incident portion is a lens, the light attenuation portion is at least one attenuation reflection surface and/or at least one attenuation transmissive surface (the attenuation reflection surface may adopt, for example, a total reflection surface, the attenuation transmissive surface may adopt, for example, a total transmissive surface), the transmission light reflection portion is at least one reflection surface (e.g., a coupling reflection surface and/or a detection reflection surface). The following is one specific example of the optical device:

The optical device has a first lens, where the first lens (may be used as the light incident portion) corresponds to a light-emitting component (e.g., a laser) arranged on the PCB and is used for receiving the light emitted by the light-emitting component and converting the light to parallel light and then outputting the parallel light, the first lens may be located right above the light-emitting component or at other positions, the first lens may be arranged on the outer surface of the optical device or at other positions; the optical device also has at least one attenuation reflection surface and/or at least one attenuation transmissive surface (i.e., the light attenuation portion), the at least one attenuation reflection surface receives the parallel light output by the first lens and totally reflects a part of the parallel light and then outputs the part of the parallel light, and/or the at least one attenuation transmissive surface receives the parallel light output by the first lens and enables a part of the parallel light to pass through the attenuation transmissive surface and then outputs the part of the parallel light. The interior of the optical device also has a coupling reflection surface and a detection reflection surface (the coupling reflection surface and the detection reflection surface constitute the transmission light reflection portion), the coupling reflection surface is used for receiving the parallel light output by the first lens and totally reflecting a part of the parallel light and then outputting the part of the parallel light to a second lens, the second lens is located in the interior or on the surface of the optical device and is used for receiving the light totally reflected by the coupling reflection surface and focusing the light and then outputting the light to the optical fiber outside of the optical device for transmitting the light signal; the detection reflection surface and the coupling reflection surface have at least one vertex, the detection reflection surface is used for receiving the parallel light output by the first lens and totally reflecting a part of the parallel light and then outputting to a monitoring reflection surface, the monitoring reflection surface totally reflects the incident light and then outputs to a light-receiving component arranged on the PCB (e.g., an optical detector), the light-receiving component detects the received light (e.g., light intensity detection), thereby detecting the light intensity transmitted to the optical fiber.

When the light signal is transmitted, the light intensity transmitted to the optical fiber needs to meet certain conditions upon the requirements of applications, in the invention, the light attenuation portion is used for attenuating or consuming a part of the parallel light in the form of reflecting them and/or making them passing through, thereby the part of the parallel light will not enter the optical fiber, so as to maintain the light intensity coupled into the optical fiber.

In order to further improve the effect of the light attenuation portion, the light attenuation portion may be arranged as one or more total reflection surfaces, and/or, one or more total transmissive surfaces according to the actual needs.

Further, the light attenuation portion may have at least one common vertex with the coupling reflection surface and the detection reflection surface, the orthogonal projection of the at least one common vertex relative to the plane where the first lens is located is in the first lens, and/or at least some of the vertexes in these common vertexes are located on the optical path of the incident light from the light incident portion. Preferably, the transmission light reflection surface, the detection reflection surface and the attenuation surface intersect at one vertex, which is similar to a vertex of a triangular pyramid, the transmission light reflection surface, the detection reflection surface and the attenuation surface spread outwardly from this vertex respectively, and the orthogonal projection of the vertex in the plane where the light incident portion is located is in the light incident portion.

In order to ensure the optical paths in the optical device not being affected by each other, the optical path of the light reflected by the coupling reflection surface, the optical path of the light reflected by at least one attenuation reflection surface, the optical path of the light transmitted by at least one attenuation transmissive surface, the optical path of the light reflected by the detection reflection surface, and the optical path of the light reflected by the monitoring reflection surface do not intersect with each other.

The optical device described above may be integrally molded from the same material, such as plastic; the inclined angle between the plane where the coupling reflection surface/the attenuation reflection surface/the attenuation transmissive surface/the detection reflection surface/the monitoring reflection surface is located and the plane where the first lens is located can be set upon specific needs, as long as the light incident thereon is totally reflected or totally pass through; moreover, if the material of the optical device is changed, the inclined angle between the plane where the coupling reflection surface/the attenuation reflection surface/the attenuation transmissive surface/the detection reflection surface/the monitoring reflection surface is located and the plane where the first lens is located should be changed accordingly, so that the light incident thereon is totally reflected or totally pass through. In the following specific example, both the inclined angle between the coupling reflection surface and the plane where the first lens is located and the inclined angle between the detection reflection surface and the plane where the first lens is located are 45 degree.

Preferably, the optical device described above is a solid structure, the light transmission inside the optical device is actually the light transmission inside the medium of the material of the optical device.

Furthermore, in order to improve the light intensity received by the light-receiving component arranged on the PCB, a third lens may be added in the optical device, the third lens is located on the optical path from the monitoring reflection surface to the light-receiving component, and may be arranged on the outer surface or in the interior of the optical device and used for receiving the light reflected by the monitoring reflection surface and focusing the light and then transmitting the light to the light-receiving component, so as to further improve the intensity of the light received by the light-receiving component.

Figure 3:
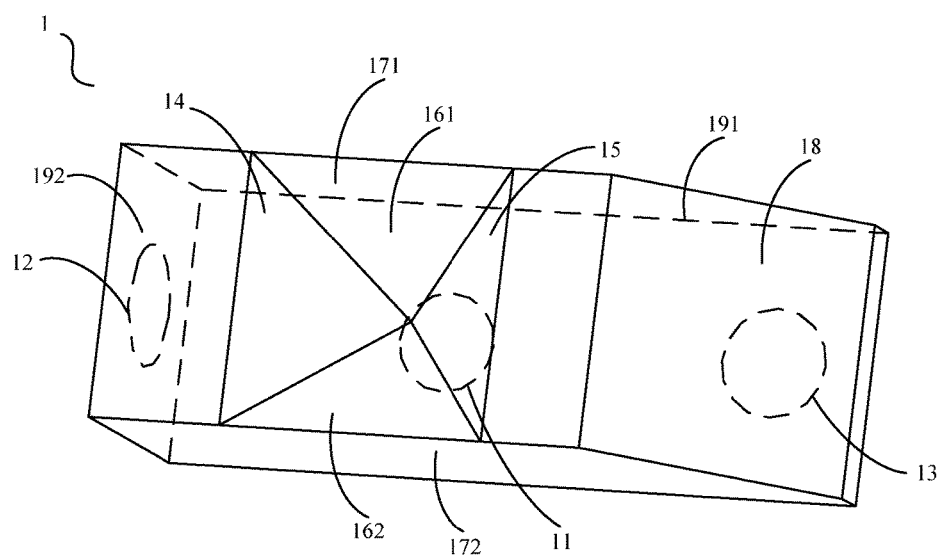
FIG. 3 is a schematic structural view of another embodiment of an optical device according to the invention.

In one preferred embodiment, the light incident portion can adopt the collimation lens 11 shown in FIG. 1, the light attenuation portion can adopt the attenuation light total reflection surface 161 shown in FIG. 1 and/or the attenuation light total reflection surface 162 shown in FIG. 3. Of course the attenuation light total reflection surface can also be replaced with an attenuation light transmissive surface and/or an attenuation light semi-reflection semi-transmissive surface, to which the invention does not limit. Specifically, the coupling reflection surface can adopt the transmission light total reflection surface 14 shown in FIG. 1, the detection reflection surface can adopt the detection light total reflection surface 15 shown in FIG. 1, the transmission light total reflection surface 14 and/or the detection light total reflection surface 15 constitutes the transmission light reflection surface of the transmission light reflection portion.

Figure 2:
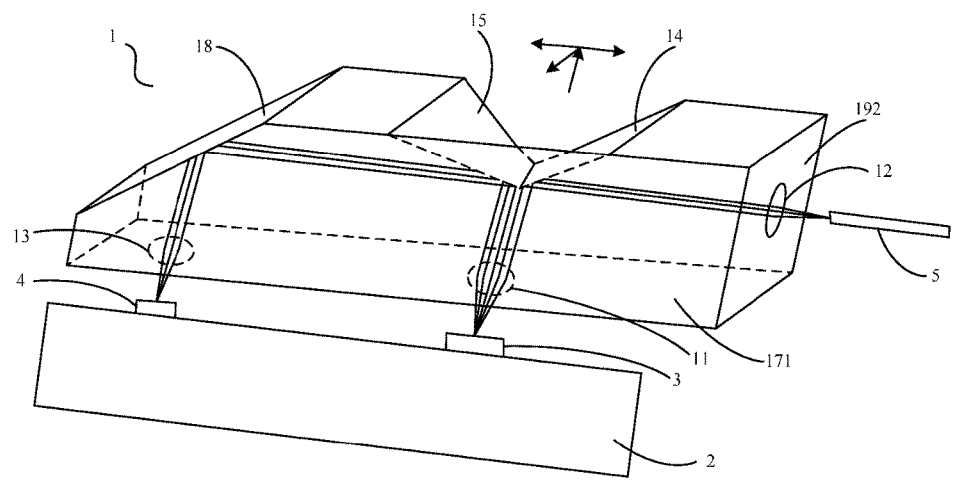
FIG. 2 is a schematic diagram of an optical path of an embodiment of an optical module having the optical device of FIG. 1.

Please refer to FIG. 1 and FIG. 2, where FIG. 1 is a schematic structural view of an embodiment of an optical device according to the invention, FIG. 2 is a schematic diagram of an optical path of an embodiment of an optical module having the optical device of FIG. 1.

As shown in FIG. 2, the optical module includes a PCB 2. A laser 3 used as a light source and an optical detector 4 used for receiving a light signal, specifically for receiving the detection light signal, are arranged on the PCB 2. An example of the optical detector 4 is a photoelectric detector, which monitors the light intensity transmitted to the coupling optical fiber through monitoring the light intensity of the detection light signal. Considering the overall size and the layout of the internal structure of the optical module, the coupling optical fiber 5 for transmitting the light signal with the outside is located on the upper right of the laser 3, the light signal emitted by the laser 3 cannot enter the coupling optical fiber 5 directly. In order to ensure the smooth transmission of the light signal, the transmission direction of the light signal needs to be changed, so that the light signal emitted by the laser 3 is transmitted into the coupling optical fiber 5. Accordingly, the optical module of this embodiment is provided with an optical device 1 which is arranged at a position above the PCB 2 and corresponding to the laser 3 and the optical detector 4. The optical device 1 is utilized for changing the transmission direction of the light signal emitted by the laser 3, so as to couple the light signal to the coupling optical fiber 5 smoothly to realize the transmission of the light signal. The optical device 1 can also attenuate the intensity of the light signal while realizing the function of direction-changing transmission of the light signal, so as to avoid the excessively strong light signal which does not meet the requirement entering the coupling optical fiber 5. Furthermore, in view of the overall structure of the optical module, the optical device can also be utilized for detecting the intensity of the light signal output from the coupling optical fiber 5. In order to achieve the above functions, the optical device 1 may have the structure shown in FIG. 1.

Specifically, as shown in FIG. 1, combined with FIG. 2, the optical device 1 of this embodiment has a first surface 191 facing the PCB 2 and a second surface 192 perpendicular to the first surface 191. A collimation lens 11 and a second focus lens 13 are arranged on the first surface 191, and a first focus lens 12 is arranged on the second surface 192. The collimation lens 11 corresponds to the laser 3 on the PCB 2, the second focus lens 13 corresponds to the optical detector 4, and the first focus lens 12 corresponds to the coupling optical fiber 5. Three total reflection surfaces are arranged above the collimation lens 11, including a transmission light total reflection surface 14, a detection light total reflection surface 15 and an attenuation light total reflection surface 161. These three total reflection surfaces have a common vertex, and extend and spread outwardly from the vertex. Moreover, the optical device 1 also has one secondary total reflection surface 18 corresponding to the detection light total reflection surface 15 and the second focus lens 13, and one transmissive surface 171 corresponding to the attenuation light total reflection surface 161. And each of the above-mentioned surfaces of the optical device 1 is arranged according to the following requirements of the transmission direction of the optical path.

The transmission light total reflection surface 14 is obliquely arranged at an inclined angle of 45 degree with respect to the parallel light transmitted by the collimation lens 11, and this arrangement enables the transmission light total reflection surface 14 to receive a part of the parallel light from the collimation lens 11 which will be transmitted outwardly through the coupling optical fiber 5, and the reflected light which is reflected by the transmission light total reflection surface 14 can be directly transmitted to the first focus lens 12.

The detection light total reflection surface 15 is obliquely arranged at an inclined angle of 45 degree with respect to the parallel light transmitted by the collimation lens 11, and this arrangement enables the detection light total reflection surface 15 to receive a part of the parallel light from the collimation lens 11 which will be detected by the optical detector 4, and the reflected light which is reflected by the detection light total reflection surface 15 can be directly transmitted to the secondary total reflection surface 18. And the secondary total reflection surface 18 is obliquely arranged in the direction which forms an inclined angle of 45 degree with the direction of the reflected light of the detection light total reflection surface 15 so that the reflected light of the secondary total reflection surface 18 is directly transmitted to the second focus lens 13.

The attenuation light total reflection surface 161 is obliquely arranged at an inclined angle of 45 degree with respect to the parallel light transmitted by the collimation lens 11, and this arrangement enables the attenuation light total reflection surface 161 to receive a part of the parallel light to be attenuated from the collimation lens 11, and the reflected light which is reflected by the attenuation light total reflection surface 161 is directly transmitted to the transmissive surface 171 which is vertical to the direction of the reflected light.

The light transmitted outwardly through the coupling optical fiber 5, the light detected by the optical detector 4, and the light to be attenuated are pre-set according to the actual needs of the light transmission system. Thus, after the light intensity and positions of these lenses are determined, the positions of each total reflection surface and the transmissive surface in the optical device 1 can be determined upon the above requirements of the transmission direction of the optical path.

The optical device 1 having the above-described structure may be applied to the optical module shown in FIG. 2, and the transmission direction of the optical path thereof and the process is as follows:

The scattered light with strong intensity emitted by the laser 3 is incident on the collimation lens 11, and then converted to parallel light by the collimation lens 11 to be output. A part of the parallel light output by the collimation lens 11, as transmission light actually output by the optical module, is incident on the transmission light total reflection surface 14, and is then transmitted towards the right side to the first focus lens 12 on the second surface 192 after being totally reflected by the transmission light total reflection surface 14, and then transmitted to the pre-set coupling optical fiber 5 after being focused and coupled by the first focus lens 12. A part of the parallel light output by the collimation lens 11, as the detection light proportional to the transmission light actually output by the optical module, is incident on the detection light total reflection surface 15. The detection light is transmitted towards the left side to the secondary reflection surface 18 after being totally reflected by the detection light total reflection surface 15, and then incident on the second focus lens 13 after its direction is changed by the secondary reflection surface 18. The second focus lens 13 focuses the detection light and then the detection light is received by the optical detector 4. By analyzing the intensity of the detection light received by the optical detector 4, the intensity of the transmission light output by the coupling optical fiber 5 can be obtained. The rest of the parallel light output by the collimation lens 11, as attenuation light to be attenuated, is incident on the attenuation light total reflection surface 161. The attenuation light is transmitted forward to the transmissive surface 171 after being totally reflected by the attenuation light total reflection surface 161, and leaves the entire optical device 1 after passing through the transmissive surface 171. Thereby the intensity of the light signal emitted by the laser 3 is attenuated.

By arranging the above total reflection surfaces and transmissive surface on the optical device 1, the light intensity can be attenuated by the total reflection surfaces and the transmissive surface, meanwhile the direction-changing transmission of the light signal is realized by the total reflection surfaces so that the light signal is finally output outwardly and the intensity of the output light signal is detected. Thus, not only the structure is simple and easy to achieve, but also light signals with different intensity can be attenuated by changing positions of the total reflection surfaces, of which the control is simple and reliable.

In practical applications, the optical device 1 is not limited to the use of one total reflection surface shown in FIG. 1 and FIG. 2 for attenuating the light intensity, but may also use two or more total reflection surfaces.

Figure 4:
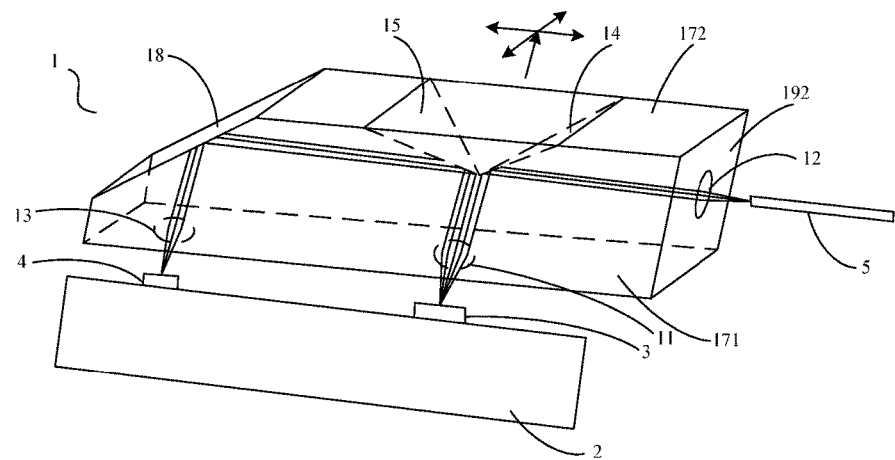
FIG. 4-FIG. 6 are schematic diagrams of optical paths of an embodiment of an optical module having the optical device of FIG. 3.

FIG. 3 shows a schematic structural view of another embodiment of an optical device according to the invention, and FIG. 4 shows a schematic diagram of an optical path of an embodiment of an optical module having the optical device of FIG. 3.

As shown in FIG. 3 and FIG. 4, the optical module also includes a PCB 2. A laser 3 used as a light source and an optical detector 4 used for receiving a light signal, specifically for receiving the detection light signal, are arranged on the PCB 2. Similar to the embodiment of FIG. 2, the coupling optical fiber 5 of the optical module of the embodiment of FIG. 4 which is used for transmitting the light signal with the outside is also located on the upper right of the laser 3. Similarly, an optical device 1 is arranged at the position above the PCB 2 and corresponding to the laser 3 and the optical detector 4.

The optical device 1 has the structure shown in FIG. 3. Specifically, similar to the embodiment of FIG. 1, the optical device 1 of this embodiment also has a first surface 191 facing the PCB 2 and a second surface 192 perpendicular to the first surface 191. A collimation lens 11 and a second focus lens 13 are arranged on the first surface 191, and a first focus lens 12 is arranged on the second surface 192. The collimation lens 11 corresponds to the laser 3 on the PCB 2, the second focus lens 13 corresponds to the optical detector 4, and the first focus lens 12 corresponds to the coupling optical fiber 5. Different from the embodiment of FIG. 1, the optical device 1 of the embodiment of FIG. 3 has four total reflection surfaces arranged above the collimation lens 11, including a transmission light total reflection surface 14, a detection light total reflection surface 15, an attenuation light total reflection surface 161 and an attenuation light total reflection surface 162. These four total reflection surfaces have a common vertex, and extend and spread outwardly from the vertex. Moreover, the optical device 1 also has one secondary total reflection surface 18 corresponding to the detection light total reflection surface 15 and the second focus lens 13, one transmissive surface 171 corresponding to the attenuation light total reflection surface 161, and one transmissive surface 172 corresponding to the attenuation light total reflection surface 162.

The arrangements and positions of the transmission light total reflection surface 14, the detection light total reflection surface 15, the secondary total reflection surface 18, the attenuation light total reflection surface 161 and the transmissive surface 171 are the same as those of the embodiment of FIG. 1, for which please refer to the description of the embodiment of FIG. 1, which will not be repeated here. Only the arrangements and positions of the attenuation light total reflection surface 162 and the corresponding transmissive surface 172 are described here. The attenuation light total reflection surface 162 and the attenuation light total reflection surface 161 are arranged symmetrically, and the transmissive surface 172 and the transmissive surface 171 are arranged symmetrically, constituting a structure for attenuating the intensity of the light emitted by the laser 3. Specifically, the attenuation light total reflection surface 162 is obliquely arranged at an inclined angle of 45 degree with respect to the parallel light transmitted by the collimation lens 11, and this arrangement enables the attenuation light total reflection surface 162 to receive a part of the parallel light to be attenuated from the collimation lens 11, and the reflected light which is reflected by the attenuation light total reflection surface 162 is directly transmitted to the transmissive surface 172 which is vertical to the direction of the reflected light.

It should be noted that, in the above-described embodiments, the light reflected by the detection light total reflection surface and the light reflected by the transmission light total reflection surface do not intersect, and the light reflected by the attenuation light total reflection surface and the light reflected by the transmission light total reflection surface do not intersect, so as to ensure the quality of the light which is reflected by the transmission light total reflection surface and finally coupled to the external optical fiber.

Figure 5:
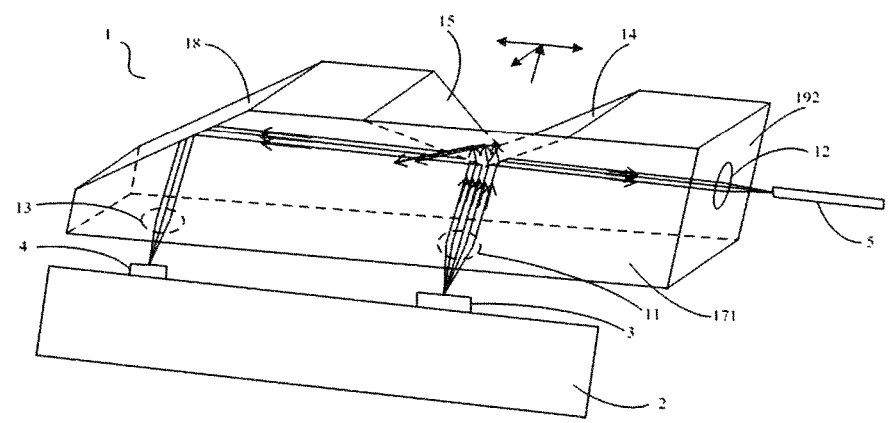
Figure 6:
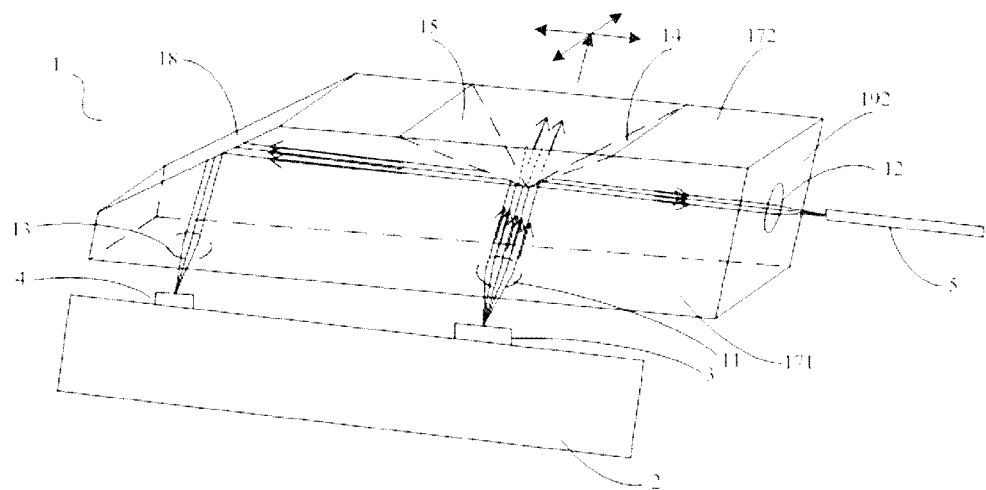

The optical device 1 having the structure of FIG. 3 may be applied to the optical modules shown in FIG. 4, FIG. 5 and FIG. 6, and the transmission direction of the optical path thereof and the process is as follows:

The scattered light with strong intensity emitted by the laser 3 is incident on the collimation lens 11, and then converted to parallel light by the collimation lens 11 to be output. A part of the parallel light output by the collimation lens 11, as the transmission light actually output by the optical module, is incident on the transmission light total reflection surface 14, and is then transmitted towards the right side to the first focus lens 12 on the second surface 192 after being totally reflected by the transmission light total reflection surface 14, and then transmitted to the pre-set coupling optical fiber 5 after being focused and coupled by the first focus lens 12. A part of the parallel light output by the collimation lens 11, as the detection light proportional to the transmission light actually output by the optical module, is incident on the detection light total reflection surface 15. The detection light is transmitted towards the left side to the secondary reflection surface 18 after being totally reflected by the detection light total reflection surface 15, and then incident on the second focus lens 13 after its direction is changed by the secondary reflection surface 18. The second focus lens 13 focuses the detection light and then the detection light is received by the optical detector 4. By analyzing the intensity of the detection light received by the optical detector 4, the intensity of the transmission light output by the coupling optical fiber 5 can be obtained. The rest of the parallel light output by the collimation lens 11, as the attenuation light to be attenuated, is divided into two parts: one part is incident on the attenuation light total reflection surface 161 and is transmitted forward to the transmissive surface 171 after being totally reflected by the attenuation light total reflection surface 161, and leaves the entire optical device 1 after passing through the transmissive surface 171; the other part is incident on the attenuation light total reflection surface 162 and is transmitted backward to the transmissive surface 172 after being totally reflected by the attenuation light total reflection surface 162, and leaves the entire optical device 1 after passing through the transmissive surface 172. Thereby the intensity of the light signal emitted by the laser 3 is attenuated, as shown in FIG. 5. Furthermore, a total transmissive surface may also be used to realize the intensity attenuation of the light signal, as shown in FIG. 6, where the parallel light incident on the total transmissive surface (not shown) totally pass through the total transmissive surface and leaves the optical device.

Finally, it should be noted that, although the attenuation light total reflection surface 161, the transmission light total reflection surface 14 and the detection light total reflection surface 15 are arranged at an inclined angle of 45 degree with the parallel light transmitted by the collimation lens 11 in the above two embodiments, which is an optimal angle and easiest to implement, it is not limited to this angle. Other angles can also be used for the arrangement, as long as the total reflection can be achieved and the subsequent transmission of the optical path can be met. In addition, the transmissive surfaces 171 and 172 are also not limited to being arranged perpendicular to the direction of the reflected light of the corresponding attenuation light total reflection surface, but may also be arranged in other angles, as long as the light which meets the intensity requirement can pass through the transmissive surfaces. Moreover, the part of the parallel light emitted by the collimation lens 11 is not limited to be directly transmitted to the first focus lens 12 immediately after being reflected by the transmission light total reflection surface 14 of only one stage, but may also be reflected by reflection surfaces of several stages after being reflected by the transmission light total reflection surface 14 and finally transmitted to the first focus lens 12. Correspondingly, the detection light is also not limited to be reflected and focused by only the detection light total reflection surface 15, the secondary total reflection surface 18 and the second focus lens 13, but may also be transmitted to the second focus lens 13 after reflections of more stages. And, the second focus lens 13 is also an optional structure, the second focus lens 13 may not be provided when the area of the optical detector 4 is large enough to directly receive the parallel light which meets the requirement.

Figure 7:
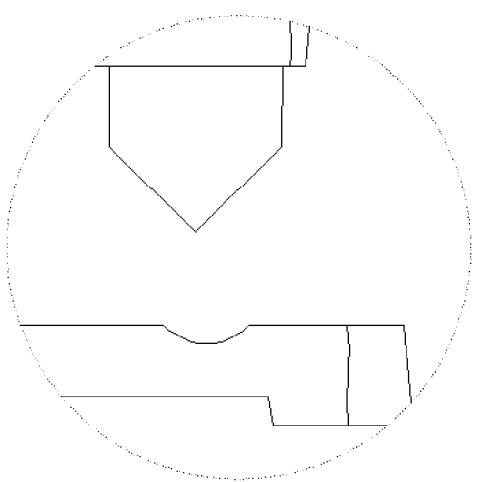
FIG. 7 is a partial structural view of an optical module having the optical device of FIG. 3.

The orthogonal projection of the common vertex of the transmission light total reflection surface 14, the detection light total reflection surface 15, the attenuation light total reflection surface 161 and the attenuation light total reflection surface 162 in the above FIG. 1-FIG. 4 relative to the plane where the collimation lens is located is in the collimation lens, as shown in FIG. 7 which is a partial schematic view of an optical module having the optical device of FIG. 3. The above-mentioned common vertex is shown in the upper portion of FIG. 7, and the collimation lens and the plane where the collimation lens is located are shown in the lower portion of FIG. 7. In summary, the foregoing embodiments are only intended for describing the technical solutions of the invention other than limiting the invention; although the invention has been described in detail with reference to exemplary embodiments, those skilled in the art should understand that they may make modifications to the technical solutions of the invention or make substitutions to some technical features thereof; these modifications or substitutions will not make the essence of the corresponding technical solutions depart from the spirit and scope of the technical solutions claimed by the invention.

What is claimed is:

1. An optical device, comprising:
a collimation lens arranged on an outer surface thereof for converting incident light emitted by a light source to parallel light;
a transmission light total reflection surface for totally reflecting a part of the parallel light transmitted by the collimation lens at a first predetermined angle so that the part of the parallel light is finally coupled to coupling optical fiber;
a detection light total reflection surface for totally reflecting a part of the parallel light transmitted by the collimation lens at a second predetermined angle so that the part of the parallel light is finally coupled to an optical detector; and
at least one attenuation light transmission surface or at least one attenuation light semi-reflection semi-transmission surface, respectively for transmitting or for semi-reflecting semi-transmitting the parallel light to be attenuated which is transmitted by the collimation lens before the parallel light to be attenuated leaves the optical device;
wherein the transmission light total reflection surface, the detection light total reflection surface and the attenuation light transmission surface meet at a common vertex, or the transmission light total reflection surface, the detection light total reflection surface and the attenuation light semi-reflection semi-transmission surface meet at a common vertex.

2. The optical device according to claim 1, wherein there is only one of the attenuation light transmission surface or only one of the attenuation light semi-reflection semi-transmission surface, and the optical device further comprises one transmissive surface corresponding to the attenuation light transmission surface or the attenuation light semi-reflection semi-transmission surface and used for making all or part of reflected light from the attenuation light transmission surface or the attenuation light semi-reflection semi-transmission surface pass through the transmissive surface.

3. The optical device according to claim 2, wherein the attenuation light transmission surface or the attenuation light semi-reflection semi-transmission surface is obliquely arranged at an inclined angle of 45 degree with respect to a direction of the parallel light transmitted by the collimation lens.

4. The optical device according to claim 2, wherein the transmissive surface is arranged vertical to a direction of the reflected light from the attenuation light transmission surface or the attenuation light semi-reflection semi-transmission surface.

5. The optical device according to claim 1, wherein there are two of the attenuation light transmission surfaces or there are two of the attenuation light semi-reflection semi-transmission surfaces, and the optical device further comprises two transmissive surfaces corresponding, one to one, to the attenuation light transmission surfaces or the attenuation light semi-reflection semi-transmission surfaces and used for making all or part of the reflected light from the corresponding attenuation light transmission surface or the attenuation light semi-reflection semi-transmission surface pass through the two transmissive surfaces.

6. The optical device according to claim 5, wherein both the attenuation light transmission surfaces or both the attenuation light semi-reflection semi-transmission surfaces are obliquely arranged at an inclined angle of 45 degree with respect to a direction of the parallel light transmitted by the collimation lens.

7. The optical device according to claim 5, wherein each of the two transmissive surfaces is arranged vertical to a direction of the reflected light from the corresponding attenuation light transmission surface or the corresponding attenuation light semi-reflection semi-transmission surface.

8. The optical device according to claim 1, wherein a first focus lens is further arranged on an outer surface of the optical device and non-coplanar with the collimation lens, and the transmission light total reflection surface is obliquely arranged in a direction which forms an inclined angle of 45 degree with the direction of the parallel light transmitted by the collimation lens so that reflected light from the transmission light total reflection surface can be directly transmitted to the first focus lens.

9. The optical device according to claim 8, wherein the optical device further comprises a second focus lens arranged coplanar with the collimation lens and one secondary total reflection surface, the detection light total reflection surface is obliquely arranged in a direction which forms an inclined angle of 45 degree with the direction of the parallel light transmitted by the collimation lens so that reflected light from the detection light total reflection surface can be directly transmitted to the secondary total reflection surface, and the secondary total reflection surface is obliquely arranged in a direction which forms an inclined angle of 45 degree with the direction of the reflected light of the detection light total reflection surface so that reflected light from the secondary total reflection surface can be directly transmitted to the second focus lens.

10. An optical module, comprising: a PCB and the light source, the optical detector, the coupling optical fiber, and the optical device according to claim 1, wherein the light source and the optical detector are arranged on the PCB.

11. The optical module according to claim 10, wherein there is only one of the attenuation light transmission surface or there is only one of the attenuation light semi-reflection semi-transmission surface in the optical device, and the optical device further comprises one transmissive surface corresponding to the attenuation light transmission surface or the attenuation light semi-reflection semi-transmission surface and used for making all or part of reflected light from the attenuation light transmission surface or the attenuation light semi-reflection semi-transmission surface pass through the transmissive surface.

12. The optical module according to claim 11, wherein the attenuation light transmission surface or the attenuation light semi-reflection semi-transmission surface is obliquely arranged at an inclined angle of 45 degree with respect to a direction of the parallel light transmitted by the collimation lens; or the transmissive surface is arranged vertical to a direction of the reflected light from the attenuation light transmission surface or the attenuation light semi-reflection semi-transmission surface.

13. The optical module according to claim 10, wherein there are two of the attenuation light transmission surfaces or there are two of the attenuation light semi-reflection semi-transmission surfaces in the optical device, and the optical device further comprises two transmissive surfaces corresponding, one to one, to the two attenuation light transmission surfaces or the two attenuation light semi-reflection semi-transmission surfaces and used for making all or part of the reflected light from the corresponding attenuation light transmission surface or the corresponding attenuation light semi-reflection semi-transmission surface pass through the two transmissive surfaces;

wherein both the attenuation light transmission surfaces or both the attenuation light semi-reflection semi-transmission surfaces are obliquely arranged at an inclined angle of 45 degree with respect to a direction of the parallel light transmitted by the collimation lens, or each of the two transmissive surfaces is arranged vertical to a direction of the reflected light from the corresponding attenuation light transmission surface or the corresponding attenuation light semi-reflection semi-transmission surface.

14. The optical module according to claim 10, wherein a first focus lens is further arranged on an outer surface of the optical device and non-coplanar with the collimation lens, and the transmission light total reflection surface is obliquely arranged in a direction which forms an inclined angle of 45 degree with the direction of the parallel light transmitted by the collimation lens so that reflected light from the transmission light total reflection surface can be directly transmitted to the first focus lens.

15. The optical module according to claim 14, wherein the optical device further comprises a second focus lens arranged coplanar with the collimation lens and one secondary total reflection surface, the detection light total reflection surface is obliquely arranged in a direction which forms an inclined angle of 45 degree with the direction of the parallel light transmitted by the collimation lens so that reflected light from the detection light total reflection surface can be directly transmitted to the secondary total reflection surface, and the secondary total reflection surface is obliquely arranged in a direction which forms an inclined angle of 45 degree with the direction of the reflected light of the detection light total reflection surface so that reflected light from the secondary total reflection surface can be directly transmitted to the second focus lens.

16. An optical device, comprising:

a light incident portion; and a light attenuation portion for attenuating a part of incident light passing the light incident portion, wherein the light attenuation portion comprises an attenuation surface, and the attenuation surface is an attenuation reflection surface; the light attenuation portion comprises an attenuation light transmission surface or an attenuation light semi-reflection semi-transmission surface, respectively for transmitting or for semi-reflecting semi-transmitting parallel light to leave the optical device; and a transmission light reflection portion for changing a transmission direction of a part of incident light passing the light incident portion, the transmission light reflection portion comprises a transmission light reflection surface, the transmission light reflection surface comprises a coupling reflection surface and/or a detection reflection surface; and, the transmission light reflection surface and the attenuation surface intersect, and at least some intersection points are located on an optical path of the incident light; the transmission light reflection portion comprises a detection light total reflection surface for totally reflecting parallel light.

17. The optical device according to claim 16, wherein an optical path of light processed by the attenuation surface and an optical path of light processed by the transmission light reflection surface do not intersect.

18. The optical device according to claim 16, wherein the transmission light reflection surface, the detection reflection surface and the attenuation surface intersect at one vertex, orthogonal projection of the vertex in a plane where the light incident portion is located is in the light incident portion.

* * * * *